July 30, 1968

J. SHORTHOUSE 3,394,827

OVERHEAD CARTON REMOVER

Filed June 13, 1966

Inventor
Joseph Shorthouse
By Cushman, Darby & Cushman
Attorneys

July 30, 1968

J. SHORTHOUSE 3,394,827

OVERHEAD CARTON REMOVER

Filed June 13, 1966

Inventor
Joseph Shorthouse
By Cushman, Darby & Cushman
Attorneys

July 30, 1968

J. SHORTHOUSE 3,394,827

OVERHEAD CARTON REMOVER

Filed June 13, 1966

Inventor
Joseph Shorthouse
By Cushman, Darby & Cushman
Attorneys

July 30, 1968

J. SHORTHOUSE 3,394,827

OVERHEAD CARTON REMOVER

Filed June 13, 1966

Inventor
Joseph Shorthouse
By Cushman, Darby & Cushman
Attorneys

July 30, 1968

J. SHORTHOUSE 3,394,827

OVERHEAD CARTON REMOVER

Filed June 13, 1966

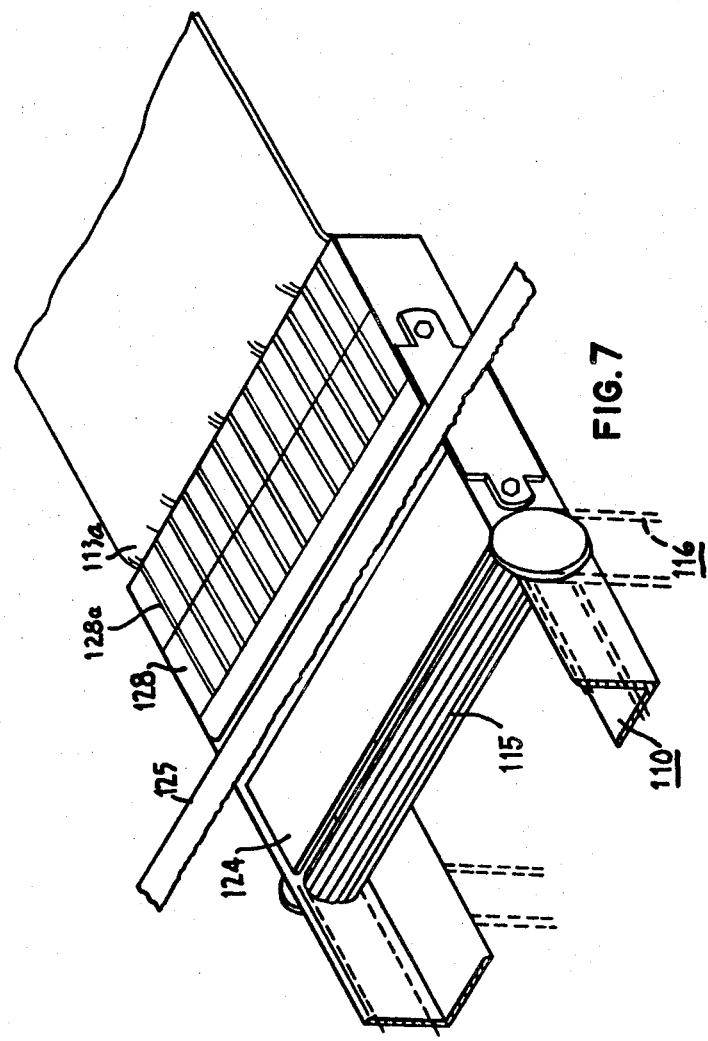

United States Patent Office 3,394,827
Patented July 30, 1968

3,394,827
OVERHEAD CARTON REMOVER
Joseph Shorthouse, Lethbridge, Alberta, Canada, assignor to Molson Breweries Limited, Montreal, Quebec, Canada
Filed June 13, 1966, Ser. No. 557,082
Claims priority, application Canada, Mar. 31, 1966, 956,890
11 Claims. (Cl. 214—305)

ABSTRACT OF THE DISCLOSURE

A machine for separating bottles from cartons including a first conveying means to transport the cartons containing the bottles along a feed path in an upright position. There is also provided means for urging a selected carton into intimate contact with the first conveying means adjacent the region of severing means which traverses the entire lateral width of the feed path and is disposed substantially parallel to the first conveying means and is spaced slightly from the plane thereof. The severing means, preferably an endless band saw, severs the bottom from the carton. There is also provided means for moving the bottomless cartons along a carton disposal feed path as well as means for supporting and moving the bottles along a feed path diverging with respect to the carton disposal feed path.

---

This invention relates to an apparatus and method for removing bottles from containers, particular containers formed from severable material, e.g., corrugated cardboard or paperboard.

Manual means for removing bottles from containers are slow, tedious and out of keeping with the present highly mechanized technology. Machines for removing bottles from cartons have therefore been devised.

In such machines, the containers containing the bottles are fed in an upright condition. In order to remove the bottles from the container using a plurality suction "fingers" which grip the necks of the bottles, free unhindered access must be provided to the carton. This requires removing the top closures and end flaps of the carton.

Such removal may be effected by means of circular saws. Alternatively, the means provided by Molson Breweries Limited, U.S. Patent No. 3,158,055 issued Nov. 24, 1964 may be used.

Another means proposed would be to feed the cartons to a bottom flap opening plow so that theoretically the bottles may fall out of the thus opened bottom and be separated from the carton.

Desirable as this technique may be there are inherent disadvantages. While flap opening plows are usually reliable, there exists the possibility that a flap may tear or that the plows may not open the entire flap. If even a small amount of the flap remains, one or more of the bottles will not fall out and consequently bring about partial failure of the operation.

Furthermore, these types of machines involve the use of a number of interdependent moving parts which increases the possibility of malfunction.

An object, therefore, of one aspect of the present invention is the provision of an apparatus for separating bottles from cartons in which they may be.

An object of another aspect of this invention is the provision of a simplified apparatus for removing a carton from bottles contained therein.

An object of a still further aspect of this invention is the provision of a novel continuous technique for separating bottles from cartons.

By one broad aspect of this invention a machine is provided for separating bottles from cartons containing said bottles, said machine comprising (a) first conveying means for conveying said cartons containing said bottles along a feed path in an upright condition, (b) means for urging a selected such carton into intimate contact with said first conveying means, (c) severing means traversing said feed path and disposed substantially parallel to said conveying means and spaced slightly from the plane of said conveying means, said cutting means being adapted to sever the bottom from said carton, (d) means for moving said bottomless cartons along a carton disposal feed path, and (e) means for supporting and moving said bottles along a feed path diverging with respect to said carton disposal feed path.

In one embodiment of this aspect of the present invention, the first conveying means (a) is a powered conveyor belt.

In another embodiment of this aspect of the present invention, the urging means (b) may be a plurality of free wheeling rollers mounted in a frame which is resiliently sprung a desired distance above the conveyor (a). Another and more preferred embodiment of this aspect of the present invention provides, as the urging means (b) a powered compression belt, e.g., a floating overhead driven conveyor belt, resiliently urged against the top of the carton, and optionally provided with a plurality of individually sprung free running rollers.

In a broad aspect of this invention, the severing means (c) is provided by a continuous, endless ribbon having one roughened edge to effect abrasive cutting to sever the carton. Ideally such severing means is provided by a loop band saw mounted horizontally across the conveyor (a) with a blade spaced a short distance, i.e., ¼ to ½" above the conveyor bed. Preferably, the conveyor bed at the band saw blade is provided by a leading plate, disposed on the same level as conveyor bed, and a trailing deflector plate, downstream of the band saw blade and disposed on the same level as the band saw blade. In a preferred aspect of such embodiment of this invention, the bottom deflector plate is provided by a grid which is adapted to permit crowns, etc. to fall through to disposal means. In this preferred embodiment of this invention, a bottom disposal chute is provided adjacent the deflector plate, the deflector plate being especially adapted to deflect the severed bottom down the inclined chute. In a most preferred aspect of this invention the disposal chute is provided by a bottom flap disposal endless driven belt.

In one embodiment of this aspect of the present invention, means (d) is provided by carton risers which are adapted to engage th bottomless carton and to elevate it along an upwardly inclined path, and means (e) is provided by a second driven belt conveyor on substantially the same horizontal plane as the first conveyor (a). In another embodiment, means (d) could be a horizontally disposed means to engage the bottomless cartons while means (e) would be a downwardly sloping conveyor. In another such embodiment means (d) could be an upwardly inclined riser, while means (e) could be a downwardly inclined conveyor. Additionally, by another aspect of this invention, carton disposal means (f) are provided comprising an endless driven belt operatively associated with the terminus of the apparatus.

By another aspect of this invention a method is provided for separating cartons from bottles contained therein, which method comprises (a) continuously supporting and advancing said cartons, (b) continuously and consecutively severing the entire bottom from consecutive such cartons while supporting said bottles, (c) continuously moving said bottomless cartons along one plane, and, (d) substantially simultaneously continuously supporting and moving said bottles in a diverging plane.

In the accompanying drawings;

FIGURE 7 is an enlarged isometric detail of the embodiment of FIGURE 4.

Figure 1:
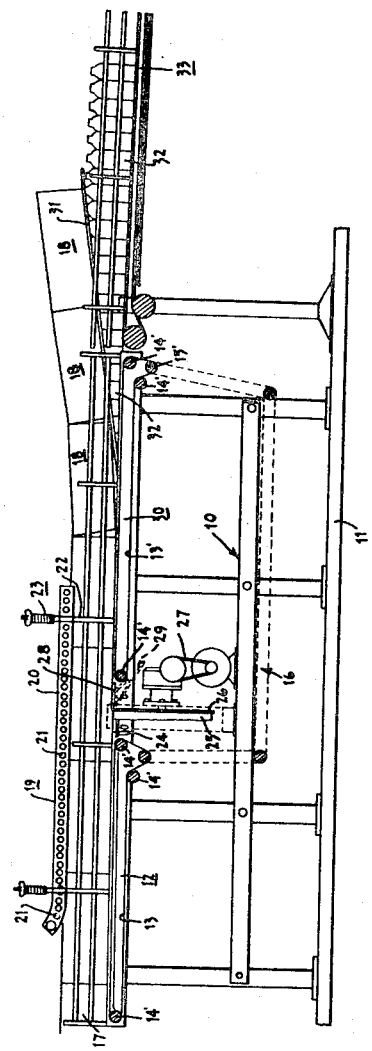
FIGURE 1 is a side elevational view of one embodiment of an apparatus according to the present invention.
Figure 2:
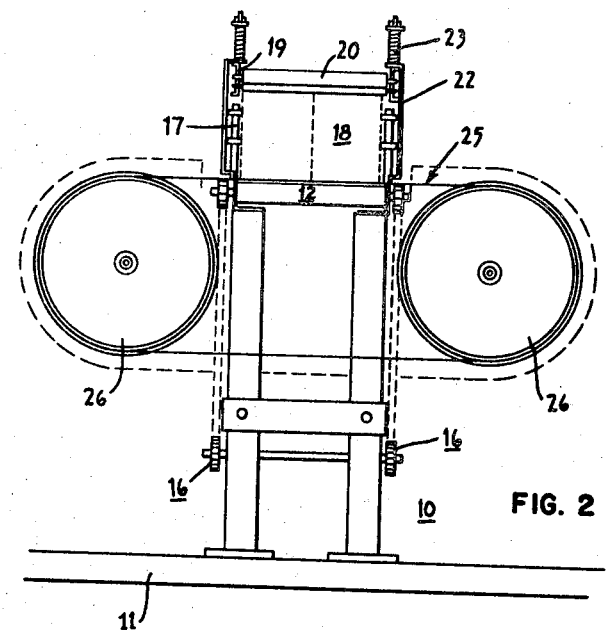
FIGURE 2 is a front end view of the embodiment of FIGURE 1.
Figure 3:
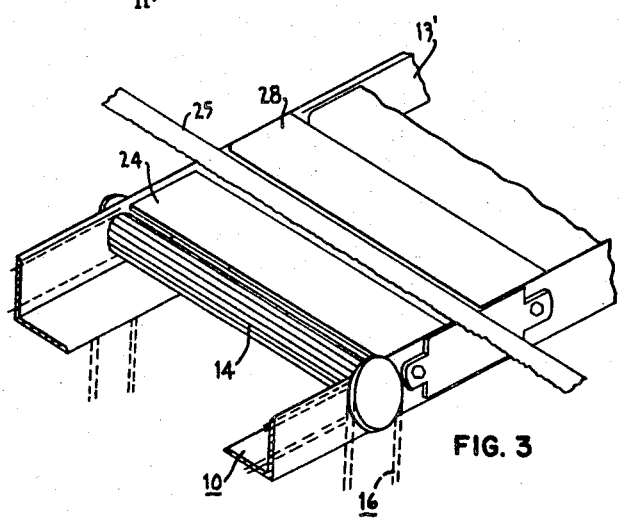
FIGURE 3 is an enlarged isometric detail of the embodiment of FIGURE 1.
Figure 4:
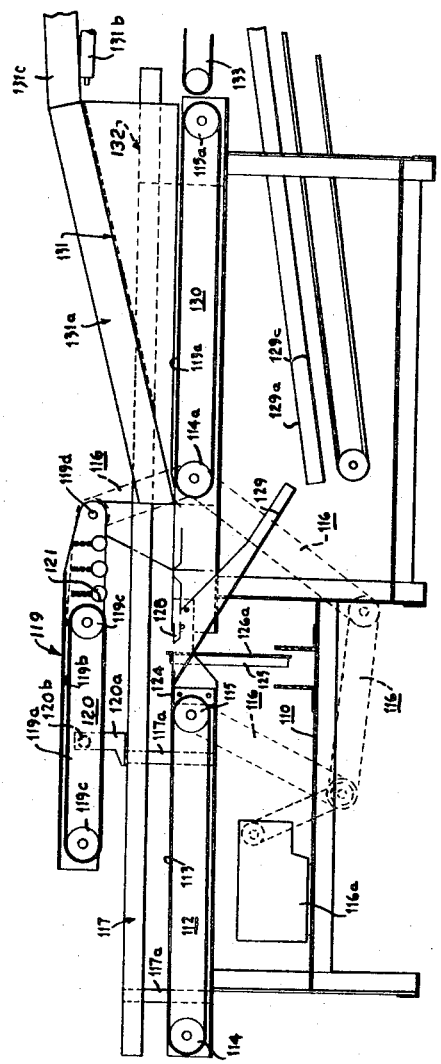
FIGURE 4 is a side elevational view of another embodiment of an apparatus according to another embodiment of this application.
Figure 5:
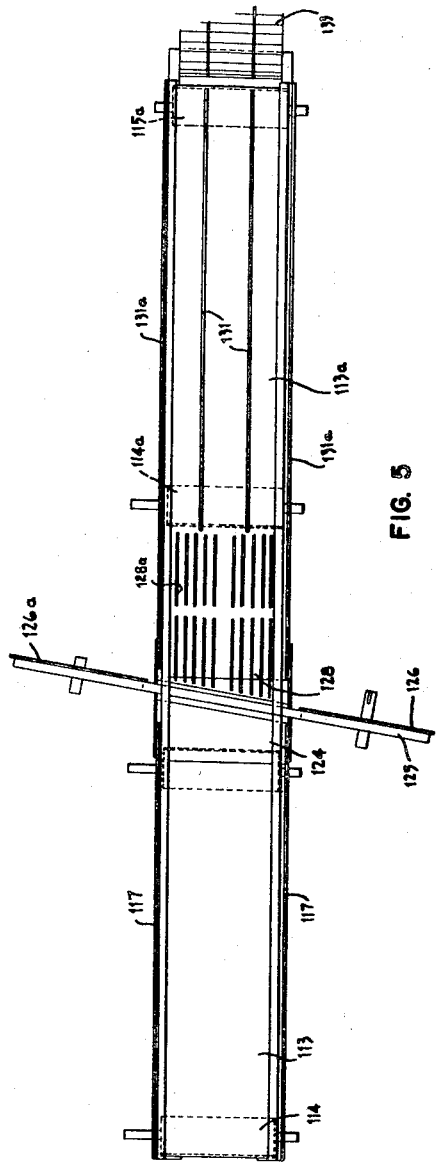
FIGURE 5 is a top plan view of the embodiment of FIGURE 4.
Figure 6:
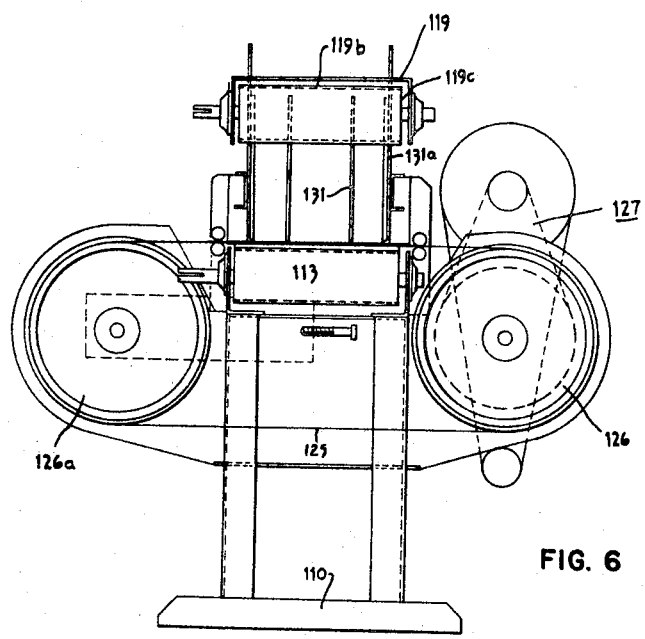
FIGURE 6 is a front end view of the embodiment of FIGURE 4.

Turning firstly to FIGURES 1–3, which represents one embodiment of this invention, the bottle remover consists generally of a frame 10 rigidly secured to a base 11. The frame is provided with an in-fed conveyor 12 including a belt 13 entraining driven rollers 14 and driven by driving roller 15. Driving roller 15 is, in turn, driven by a chain drive mechanism 16.

Mounted on the frame is a pair of parallel spaced apart carton guide rails 17, to guide the cartons 18 in alignment along the conveyor 12. Disposed above conveyor 12 is an assembly 19 provided to urge containers 18 into engagement with the conveyor 12. Assembly 19 is constituted by a pair of spaced apart frame rails 20 between which are mounted a plurality of free-wheeling rollers 21. The rollers 21 are urged into contact with the tops of the cartons 18 since frame rails 20 are resiliently sprung on bars 22 by means of a conventional springing assembly 23.

At the outfeed end of conveyor 12 is the carton bottom severing station, seen in detail in FIGURE 3. As shown, this includes a forward plate 24 mounted in the same plane as the bed of conveyor 12. Spaced a slight distance, e.g., ¼" above plate 24 is a band saw blade 25, entraining pulleys 26, one of which is driven by motor-reduction gear assembly 27. Disposed downstream of the band saw blade 25 and in the same plane thereof is the bottom deflector plate 28 adapted to deflect the severed bottom of the carton 18 down the inclined chute 29.

Disposed downstream of the plate 28 is a second powered belt conveyor 30, similar to conveyor 12, and including belt 13' and rollers 14' and 15'.

Near the terminal end of conveyor 30 and disposed immediately thereupon are a pair of parallel spaced apart upwardly inclined guide bars 31 upon which the driven cartons 18, having the bottoms removed are adapted to be slid. By this elevation of the cartons 18, the bottles 32 contained therein are freed from the cartons. The bottles are then conveyed by means of a conventional chain conveyor 33 to the conventional further treating operations.

Turning now to FIGURES 4, 5, 6 and 7 it is seen that this preferred embodiment of the carton unloader includes a frame 110 having mounted thereon at the infeed end a powered belt conveyor 112 and a pair of parallel side carton guides 117, the latter being secured by uprights 117a. The conveyor includes a belt 113 and driven roller 114 and drive roller 115. Drive roller 115 is driven by means of chain and sprocket mechanism 116 and motor 116a.

To maintain the cartons (not shown) in sufficient contact with the conveyor 112, there is provided an assembly 119. Assembly 119 includes therein a floating overhead driven conveyor 119a including a belt 119b entraining rollers 119c and 119d. Also included are a plurality of individually sprung free running rollers 121. The framework 120 for conveyor 119a is pivotally mounted to bracket 120a by means of pin 120b so that the chain sprocket assembly 116 provides the force to urge the belt 119b into contact with the tops of the cartons (not shown).

At the severing station is provided a forward plate 124, mounted in the same horizontal plane as the bed of conveyor 112. Disposed downstream of plate 124, but spaced about ¼" thereabove is band saw blade entraining driven pulley 126a and drive pulley 126, driven by motor assembly 127. Disposed downstream of blade 125 and in the same horizontal plane thereof is a bottom deflector plate 128 provided with a plurality of slots 128a. Thus deflector plate 128 is a grid which permits the disposal of crowns, etc. plate 128 is adapted to deflect the carton bottoms down the inclined chute 129 and to the waste chute 129a where it is led to the conventional baling equipment via a powered belt conveyor 129c.

Disposed downstream of plate 128 is a second powered belt conveyor 130 similar to conveyor 112 and including belt 113a and rollers 114a and 115a. In the space between the plate 124 and the conveyor 130 is situated a plurality of parallel crown grids 128 on which the bottles are adapted to slide.

At the forward end of conveyor 130 are disposed a plurality of spaced apart upwardly inclined carton risers 131 upon which the bottomless cartons are adapted to be propelled. To assist in the proper movement of such cartons, a pair of spaced apart parallel carton riser side rails 131a are provided. The cartons are thus adapted to be urged upwardly away from the bottles and to a carton conveyor 131b, where it is led to a conventional baler (not shown) by means of a powered carton conveyor 131c.

The elevation of the bottomless cartons permits the bottles to fall unhindered onto the conveyor 130. A pair of parallel guides 132 in effect extensions of guides 117 are operative as bottle guides at this time. The bottles are fed by a conventional chain conveyor 133 to the conventional further treating operations.

The cartons should, of course, be of a type which are capable of being severed by the band saw. In practice these consist of paperboard or corrugated cardboard containers.

I claim:

1. A machine for separating bottles from cartons containing said bottles comprising:
   (a) first conveying means for conveying said cartons containing said bottles along a feed path in an upright condition,
   (b) severing means extending transversely the entire extent of said feed path and disposed substantially parallel to said conveying means and spaced slightly from the plane of said conveying means, said severing means being adapted to sever the bottom from said carton,
   (c) means for urging a selected carton into intimate contact with said first conveying means in the region of said severing means,
   (d) means for moving said bottomless cartons along a carton disposal feed path, and
   (e) means for moving and supporting said bottles along a feed path diverging with respect to said carton disposal feed path.

2. The machine of claim 1 wherein said first conveying means (a) is a powered conveyor belt.

3. The machine of claim 1 wherein said urging means (c) is provided by a plurality of rollers mounted in a frame which is resiliently sprung a selected distance above conveying means (a).

4. The machine of claim 1 wherein said urging means (c) is a powered compression belt adapted to be resiliently urged against the top of the carton.

5. The machine of claim 1 wherein said severing means (b) is provided by a continuous endless ribbon having one roughened edge to effect abrasive cutting.

6. The machine of claim 5 wherein said means (b) is a band saw blade.

7. The machine of claim 6 wherein said conveyor bed (a) at the area of said band saw blade is provided with a leading plate disposed on substantially the same plane as said conveyor bed, and a trailing deflector plate, downstream of said band saw blade and disposed on substantially the same plane as said band saw blade.

8. The machine of claim 7 wherein said trailing deflector plate is provided by a gridwork.

9. The machine of claim 7 including (f) conveyor means below said trailing deflector plate to remove bottom flaps deflected thereon.

10. The machine of claim 2 wherein said means (d) is provided by carton risers adapted to engage a carton thereby to elevate it along an upwardly inclined path, and means (e) is provided by a second driven belt conveyor on substantially the same horizontal plane as said first conveyor (a).

11. The machine of claim 2 wherein said means (d) is provided by carton risers adapted to engage a carton thereby to elevate it along an upwardly inclined path, and said means (e) is provided by a downwardly sloping conveyor.

References Cited
UNITED STATES PATENTS

| | | | |
|---|---|---|---|
| 1,294,675 | 2/1919 | Kiner | 198—165 |
| 2,323,852 | 7/1943 | Siedel et al. | 214—304 |
| 2,805,762 | 9/1957 | Kampfer | 198—165 |
| 3,022,912 | 2/1962 | Vincent | 214—305 |
| 3,310,187 | 3/1967 | Barker et al. | 214—304 |

HUGO O. SCHULZ, *Primary Examiner.*